2 Sheets—Sheet 1.

G. H. CORMACK,

Assignor to A. M. JOHNSTON & Co

Oatmeal Machine.

No. 9,558. Reissued Feb. 8, 1881.

Witnesses.
M. E. Haight
A. C. Behel

Inventor.
George H. Cormack,
Per Jacob Behel.
Atty

G. H. CORMACK,

Assignor to A. M. JOHNSTON & Co.

Oatmeal Machine.

No. 9,558. Reissued Feb. 8, 1881.

Witnesses.
M. E. Haight
A. O. Bebel

Inventor.
George H. Cormack.
Per Jacob Behel
Atty.

UNITED STATES PATENT OFFICE.

GEORGE H. CORMACK, OF ROCKFORD, ILLINOIS, ASSIGNOR TO A. M. JOHNSTON & CO., OF SAME PLACE.

OATMEAL-MACHINE.

SPECIFICATION forming part of Reissued Letters Patent No. 9,558, dated February 8, 1881.

Original No. 204,137, dated May 28, 1878. Application for reissue filed December 2, 1880.

*To all whom it may concern:*

Be it known that I, GEORGE H. CORMACK, of the city of Rockford, in the county of Winnebago and State of Illinois, have invented a new and useful Improvement in Oat-Milling Machines, of which the following is a specification.

This invention relates to that class of machines employed in the manufacture of oatmeal or grits, and is employed to cut the oat-grains, after the chaffy hull or shuck has been removed therefrom, into small sections, forming clean sharp grits, with but little waste.

To this end I have devised and constructed the machine represented in the accompanying drawings, in which—

Figure 5:
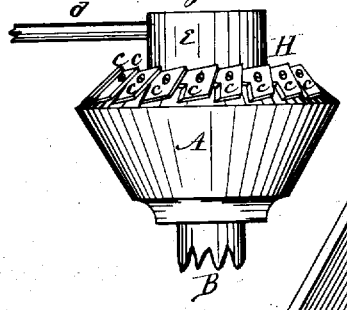
Figure 1:
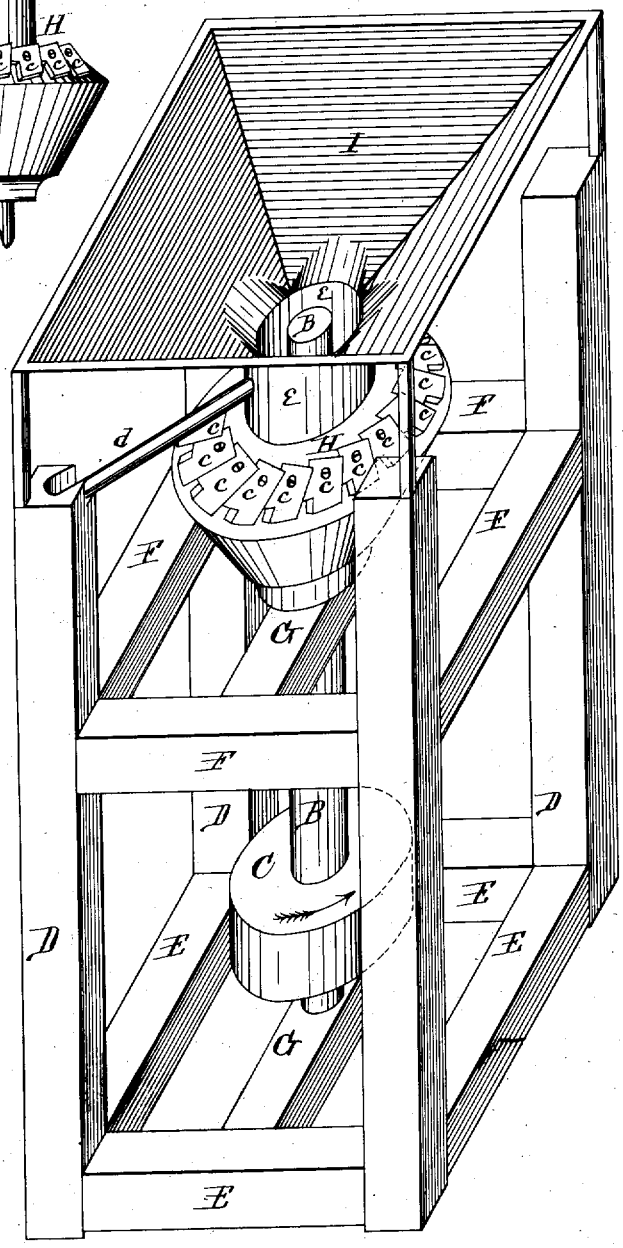
Figure 2:
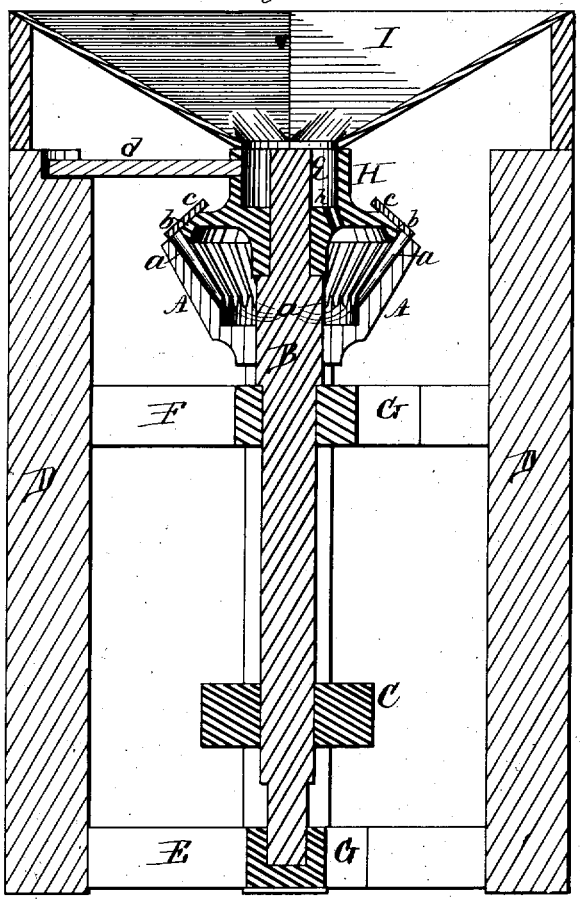
Figure 3:
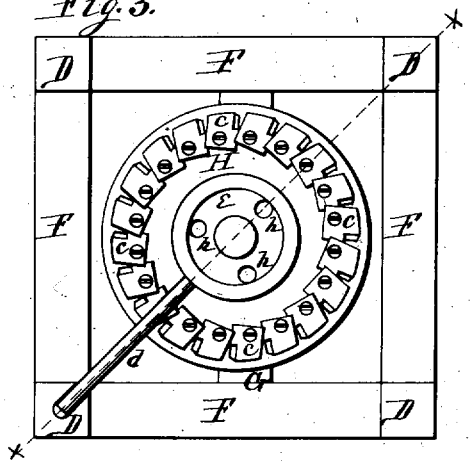
Figure 4:
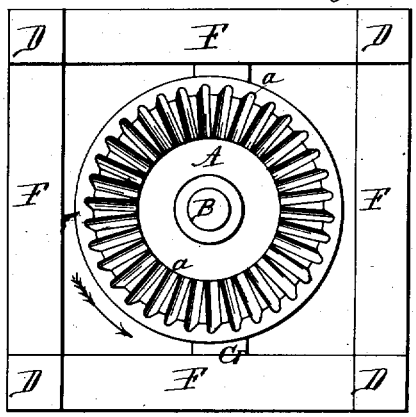

Figure 1 is an isometrical representation of my improved oatmeal-cutter. Fig. 2 is a diagonal vertical section on dotted line X on the plan view. Fig. 3 is a plan view, in which the hopper is omitted to show the upper surface of the cap and the cutters secured thereto. Fig. 4 is also a plan view, in which the cap is omitted to show the inner grooved surface of the conic cup-formed carrier. Fig. 5 is a side elevation of the conic cup-formed carrier.

In the drawings, A represents a conic cup-formed carrier with large end open, and is fixed to the vertical shaft B with large open end upward. The inner inclined walls of this carrier, forming its inner surface, are grooved radially, as at *a*, resembling somewhat in general appearance an internal bevel-tooth gear-wheel. The grooves, however, are preferably made with curved or circular bottoms, and the teeth are preferably inclined slightly in the direction of the rotation of the carrier, so as to present a perpendicular wall on the forward moving side of the teeth.

C is a pulley fixed to the shaft B, and is designed to receive a belt from a driving-pulley to impart rotary motion to the shaft and the conic cup-formed carrier A mounted thereon, and in the direction indicated by the arrow. This shaft, with the conic cup-formed carrier and belt-pulley secured thereto, is mounted in a vertical position to revolve in suitable bearings centrally in the rectangular frame, composed of posts D, sills E, girts F, and center cross-beams G, framed together, as represented in the drawings.

H is a cap, of the form represented in the drawings, and is fitted to the upper reduced portion of the shaft B, resting on a shoulder on the shaft in the carrier in such a manner as to permit the shaft to revolve in it freely. This cap is formed with a rim, *b*, on its under face and outer edge, beveled to drop freely into the upper end of the carrier. The outer rim, *b*, of the cap H is beveled on its upper side, so that its beveled surface will be about at a right angle with the bottom of the grooves in the inner inclined face of the conic carrier A. This beveled surface is formed in inclined steps at proper intervals to receive the cutters *c* in such a manner that the rear edge of each cutter will overlap the front edge of the cutter in its rear. The cutters *c* are secured one on each inclined step of the outer rim of the cap, by means of rivets or screws, in such a manner that their outer cutting ends overlap the outer ends of the grooves in the conic carrier, and that portion of the cutters which overlaps the outer grooved edge of the conic carrier is beveled on their upper side and forward edge, forming a cutting-edge. In this instance, the cap, with the cutters secured thereto, is connected with the rectangular frame by means of a bar, *d*, by which it is held in a fixed position relatively with the frame, and in such a manner that the conic carrier will revolve freely under it. This cap H is provided centrally on its upper side with a cup, *e*, which receives the lower end of the hopper I, the outer corners of which are supported on stanchions resting on the corner posts of the frame. The cup *e* is provided with openings *h* through its bottom to admit the grain from the hopper to the conic cup-formed carrier.

In the manufacture of oatmeal with my improved machine the operation is as follows: The shelled oats, being placed in the hopper I, enter the cup *e* and pass through the opening *h* in its bottom into the conic cup-formed carrier A, which is made to revolve at a high speed by means of a suitable connection with a motor. The centrifugal force produced by the high speed of the conic carrier causes the oat-grains to slide endwise up the grooves in the inclined inner walls of the carrier, and is carried against the edge of the cutters, and is cut into sections of a length about equal to the depth between the under sides of the cutters at the point where the cutters come in contact with the grain, which is about equal to the vertical distance between the front and rear edges of the inclined steps on the upper beveled surface of the outer rim of the cap H.

In the construction of machines the length of the cuts of the grits may be varied by varying the inclination of the cutters on the cap. This perhaps would be best accomplished by varying the angle of the steps which form the seat of the cutters. By reason of the square cut produced with fine-edged cutters, a better quality and an increased quantity of grits is produced from an equal quantity of grain than with other machines now in use.

In this instance I have represented my machine with the open end of the conic carrier A upward; but my machine is capable of use inverted, and I have represented my machine with the cap to which the cutters are secured as stationary; but when a very high velocity is necessary to insure the ascent of the grain up the grooves in the carrier, the stroke of the grain against the cutter-edges might be such as to break the grits into small particles, which would tend to lessen the quantity and impair the quality of the meal produced. In such instances the cap to which the cutters are secured may be made to revolve in the same direction as the conic carrier, but at a less velocity, regulated to move at such relative velocity with the carrier so as to produce the largest quantity and best quality of meal from the grain.

In the foregoing I have employed a conic cup-formed carrier grooved on its inner inclined walls, instead of which a carrier having concave or convex inner surfaces radially grooved; or instead of the cup form a disk radially grooved, or any other known form capable of such use may be employed without departing from the gist of my invention, so long as the grain is carried to the cutters by centrifugal force in grooves in a revolving surface.

I claim as my invention—

1. In an oatmeal-cutter, the combination, with a hopper or carrier adapted to be rotated in a horizontal plane, the inner surface of said hopper being provided with radial grooves which lead to the outer edge thereof, of suitable cutters, located in close proximity to the edge of said carrier or hopper, substantially as set forth.

2. In an oatmeal-cutter, the combination, with a hopper or carrier adapted to be rotated in a horizontal plane, the inner surface of the hopper being provided with radial grooves which extend to the outer edge thereof, of a series of inclined cutters, located and adjustably secured in close proximity to the outer edge of said grooved carrier or hopper, substantially as set forth.

3. The combination, with a rotary carrier provided with carrying grooves leading from its central portion outward, and operating to carry the grains outward by centrifugal force, of cutters constructed and arranged to sever the grains simultaneously at different points on the periphery of the rotary carrier, substantially as set forth.

4. The combination, with a rotary carrier provided with grain carrying and guiding grooves leading from its central portion outward, and adapted to feed the grain by centrifugal force, of stationary cutters, located in close proximity to the delivery ends of the grooves to divide the grains into sections, substantially as set forth.

GEORGE H. CORMACK.

Witnesses:
J. S. SMITH,
A. O. BEHEL.